(12) United States Patent
Armstrong

(10) Patent No.: US 9,222,462 B2
(45) Date of Patent: Dec. 29, 2015

(54) WIND TURBINE

(75) Inventor: Thomas B. Armstrong, Abbotsford (CA)

(73) Assignee: SP Power Farm Group Ltd., Abbotsford, B.C. (CA)

( * ) Notice: Subject to any disclaimer, the term of this patent is extended or adjusted under 35 U.S.C. 154(b) by 312 days.

(21) Appl. No.: 13/175,828

(22) Filed: Jul. 2, 2011

(65) Prior Publication Data

US 2013/0001950 A1    Jan. 3, 2013

(51) Int. Cl.
*F03D 9/00*  (2006.01)
*H02P 9/04*  (2006.01)
*F03D 3/06*  (2006.01)

(52) U.S. Cl.
CPC ......... *F03D 3/065* (2013.01); *F05B 2220/7068* (2013.01); *Y02E 10/74* (2013.01)

(58) Field of Classification Search
CPC ........... F03D 3/065; F03D 9/00; F03D 11/02; Y02E 10/74; F05B 2220/7068
USPC .................. 290/55, 44, 43, 54; 416/170 R
See application file for complete search history.

(56) References Cited

U.S. PATENT DOCUMENTS 4,350,895 A * 9/1982 Cook .............................. 290/55

* cited by examiner

*Primary Examiner* — Javaid Nasri
(74) *Attorney, Agent, or Firm* — K&L Gates LLP

(57) ABSTRACT

A wind turbine includes a turbine housing, a turbine wheel system housed in the turbine housing, and a wind power converting system for converting kinetic energy generated by the turbine wheel system into electrical energy. The turbine wheel system includes a turbine rotor being driven to rotate circumferentially around an interior of the turbine housing, and a rail frame guiding a rotational movement of a turbine rotor. The wind turbine not only allows airflow to move across and through the turbine wheel system but also allows airflow to be directed and exhausted to maximize and control energy generation. The wind turbine is able to efficiently convert wind power to electrical power via a turbine wheel system which allows for the load generated to be distributed across the circumference of the turbine wheel system instead of localized in the center as the traditional wind turbine.

28 Claims, 19 Drawing Sheets

WIND TURBINE

BACKGROUND

1. Field of the Invention

The present invention relates to a wind turbine. More particularly, the present invention relates to a wind turbine which not only allows airflow to move across and through the wind turbine but also allows airflow to be directed and exhausted to maximize and control energy generation.

2. Discussion of the Related Art

The potential for an energy crisis has never been, higher. Alternative energy, such as solar energy or wind energy, has got the potential to play an extremely important role in the foreseeable future with the planet's energy production. Alternative energy sources are renewable and are thought to be free energy sources. Wind power is now the world's fastest growing energy source and has become one of the most rapidly expanding industries since wind power is considered as safe and clean energy, and is one of the cheapest forms of energy available today.

Generally speaking, there are two basic types of wind turbine, i.e. the vertical type and horizontal type. The vertical type wind turbine, such as Darrieus wind turbine, is a type of vertical axis wind turbine (VAWT), wherein the aerofoils are vertically mounted on a rotating shaft. The horizontal type wind turbine, such as Dutch windmill, is a type of horizontal axis wind turbine (HAWT), wherein the blades are mounted to horizontal axis. The conventional wind turbine is generally comprised of a gearbox, a pitch and yaw control motor, a traditional generator, a cooling system, a liquid cooling system, a heat exchanger, and an oil cooler. The structure of the conventional wind turbine is complicated and required high manufacturing and maintaining cost.

Particularly, the conventional wind turbine further has several drawbacks. Since the wind turbine must be set up at a high wind-load area, the wind turbine can be damaged or destroyed by heavy storm or lightning. Hundreds of wind turbines must be concurrently set up in one area in order to produce a consistently electrical power. Therefore, the design of wind turbine does not fit for residential building or high rise building since the high rise building does not provide enough space to set up the wind turbine. There have been instances in the past, when the rotating blades of the wind turbines have proved fatal for birds that happened to hit it. The design of wind turbine may destroy the beauty of the land.

BRIEF SUMMARY OF THE INVENTION

The present invention overcomes the above mentioned drawbacks and limitation by providing a wind turbine.

The primary objective of the present invention is that the wind turbine can simplify the entire complicated structure of the conventional wind turbine by eliminating the components of gearbox, traditional generator, cooling system, liquid cooling system, heat exchanger and oil cooler. The wind turbine of the present invention can efficiently convert wind power to electrical power via a turbine wheel system which allows for the load generated to be distributed across the circumference of the turbine wheel system instead of localized in the center as the traditional HAWT or VAWT.

The wind turbine of the present invention is comprised of a turbine housing, a turbine wheel system enclosed within the turbine housing, and a wind power converting system.

The turbine wheel system is comprised of a supporting frame, a turbine rotor supported by the supporting frame, and a rail frame coupled to the supporting frame to guide a rotational movement of the turbine rotor. The turbine rotor is comprised of a circular upper rim, a circular lower rim spaced apart from the upper rim and a plurality of blades spacedly extended between the upper and lower rims, wherein the turbine rotor is driven to rotate along the rail frame and circumferentially around and the turbine housing in responsive to wind force exerting at the blades.

The power converting system is operatively coupled with the turbine wheel system for converting kinetic energy of the turbine wheel system into electrical energy.

Another objective of the present invention is that the wind turbine not only allows airflow to move across and through the wind turbine but also allows airflow to be directed and exhausted to maximize and control energy generation.

Another objective of the present invention is that the wind turbine allows multiple energy output.

Another objective of the present invention is that the wind turbine is designed to reduce the complexity of manufacturing, transportation, setup, and overall maintenance requirements.

Another objective of the present invention is that the wind turbine, wherein the turbine rotor is the only major moving component of the wind turbine, so that the traditional gearbox, yaw, motors, and pitch control system will be eliminated to reduce the maintenance of the wind turbine. Thus, no complicated casting or component used or required.

Another objective of the present invention is that the wind turbine provides a mono-rail system with multiple bearing supports to guide and support the rotation of the turbine rotor via multiple stands around the circumference of the turbine rotor 204. Therefore, the mono-rail system can remove the loads generated from the traditional center bearings to the circumference of the turbine rotor.

Another objective of the present invention is that the turbine wheel system is stackable that one turbine wheel system is stacked on top of another turbine wheel system to enhance the efficiency of electrical energy production and to reduce the land usage to build the wind turbine.

Another objective of the present invention is that the turbine wheel system is housed in a housing to protect wildlife and reduce noise. The housing is further able to incorporate with other forms of renewable energy system such as mounting solar panels at the roof of the housing and/or providing space inside the housing for hydrogen generation (HOGEN) storage system for any excess energy production storage.

For a more complete understanding of the present invention with its objectives and distinctive features and advantages, reference is now made to the following specification and to the accompanying drawings.

BRIEF DESCRIPTION OF THE DRAWING(S)

FIGS. 9A and 9B shows the airflow straight through the turbine rotor in accordance with the present invention, wherein FIG. 9A is the side view of the turbine rotor and FIG. 9B is the top view of the turbine rotor.

FIGS. 10A and 10B shows the airflow straight through the turbine rotor to the roof and/or floor in accordance with the present invention, wherein FIG. 10A is the side view of the turbine rotor and FIG. 10B is the top view of the turbine rotor.

FIGS. 11A and 11B shows the airflow from 360 degrees across the turbine rotor from outside to inside in accordance with the present invention, wherein FIG. 11A is the side view of the turbine rotor and FIG. 11B is the top view of the turbine rotor.

FIGS. 12A and 12B shows the airflow from 360 degrees across the turbine rotor from inside to outside in accordance with the present invention, wherein FIG. 12A is the side view of the turbine rotor and FIG. 12B is the top view of the turbine rotor.

DETAILED DESCRIPTION OF THE INVENTION

In accordance with a preferred embodiment of the present invention, the present invention provides a wind turbine which is comprised of a turbine housing 100, a turbine wheel system 200, and a wind power converting system 300.

Figure 1:
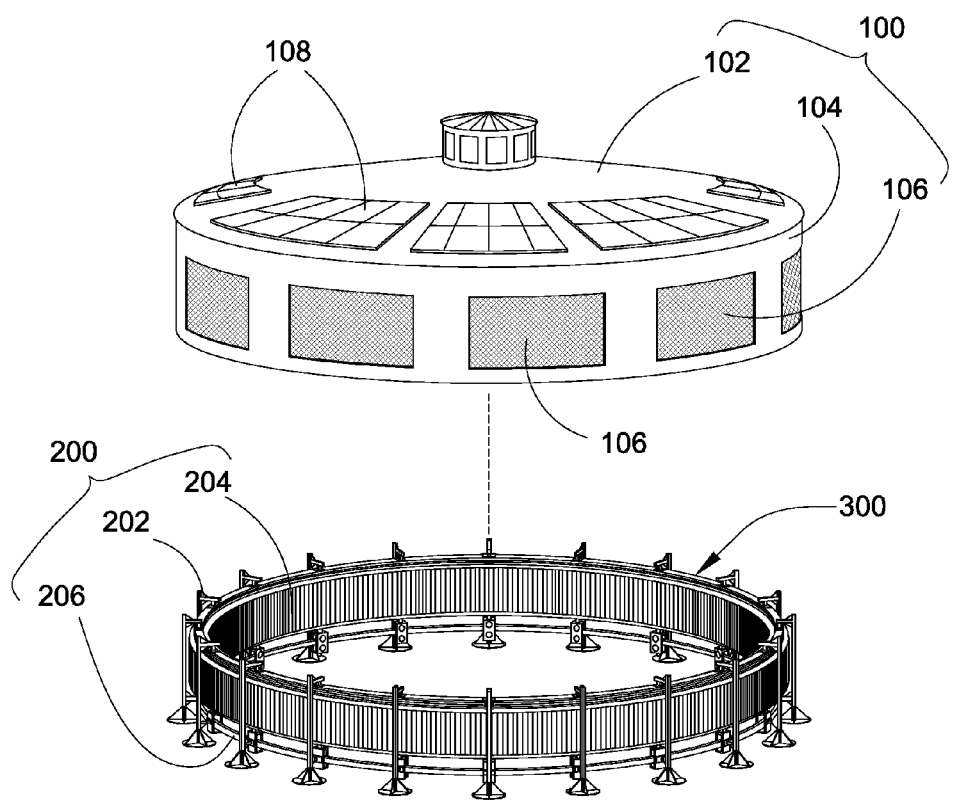
FIG. 1 is a schematic view of a wind turbine in accordance with the present invention, showing the turbine housing being exploded from the turbine wheel system and the turbine housing incorporating with solar panels.

FIG. 1 depicts the turbine housing 100 which is comprised of a top roof 102 and a circumferential wall 104 forming an interior, wherein a plurality of airflow screens 106 are formed at the circumferential wall 104 for enabling airflow flowing in and out the interior of the turbine housing 100 through the airflow screens 106. The top roof 102 has an air vent for air circulation.

Figure 2:
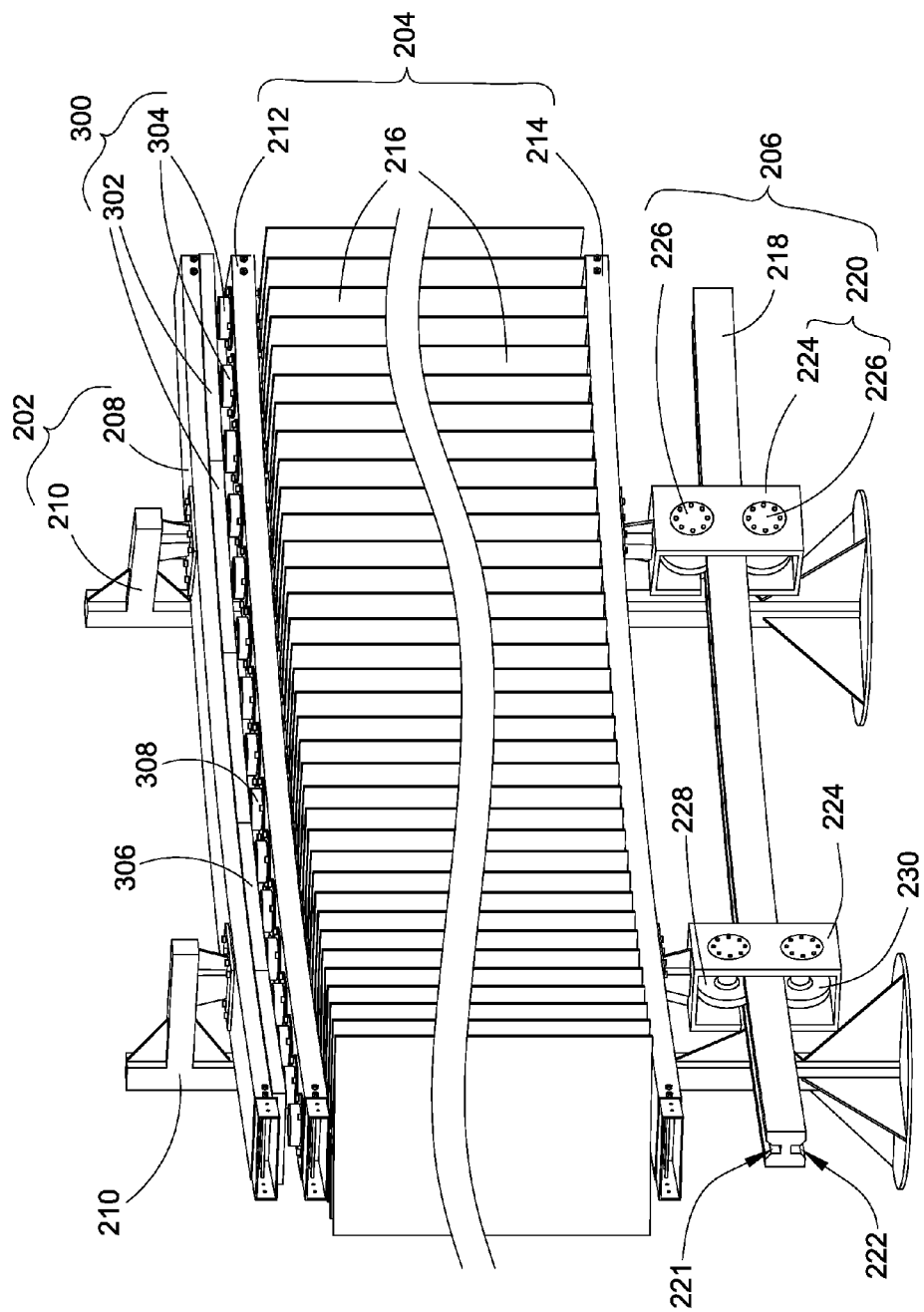
FIG. 2 is a partially schematic view of the turbine wheel system in accordance with the present invention.

FIGS. 1 and 2 depict the turbine wheel system 200 being received in the turbine housing 100. The turbine wheel system 200 is comprised of a supporting frame 202, a turbine rotor 204 supported by the supporting frame 202, and a rail frame 206 coupled to the supporting frame 202 to guide a rotational movement of the turbine rotor 204.

The turbine rotor 204 is rotated within the turbine housing 100 when the airflow passes through the airflow screens 106.

The turbine housing 100 enables the ease of assembly on site. With known high wind-load area, the present invention do not requires a period of calm winds to complete the construction and setup. As the turbine housing 100 encloses the turbine wheel system 200, it will not be subject to wind loading during assembly process. This allows for a higher and faster return on investment for the customer. The turbine wheel system 200 can be built at ground level say along a ridge line with minimal visual impact. The turbine housing 100 can be painted or camouflaged as required.

The turbine housing 100 further protects wildlife and reduces noise generated by the turbine wheel system 200. The turbine housing 100 provides the ability to greatly reduce or stop birds, bats, and other species from contacting any part of turbine wheel system 200. Noise generated from wing tip speed is eliminated as the blades are always moving in concert.

The turbine housing 100 also allows options for storage of energy and other means of energy generation. The outside surface area of the turbine housing 100 would allow for mounting of solar panels 108. In FIG. 1, the solar panels 108 are mounted on the top roof 102 of the turbine housing 100 for solar energy collection. Available space inside the turbine housing 100 ideals for Hydrogen Generation (HOGEN) storage system for any excess energy production storage. It will be discussed later.

In FIG. 2, the supporting frame 202 is comprised of a circular top frame 208 and a plurality of supporting posts 210 downwardly extended from the top frame 208 to support the top frame 208 above the turbine rotor 204 and to support the rail frame 206 below the turbine rotor 204. Therefore, the turbine rotor 204 is supported between the top frame 208 and the rail frame 206. The supporting posts 210 are circumferentially located at the turbine rotor 204. Depending the size of the turbine rotor 204, numbers of supporting posts 210 will be varied to support the turbine rotor 204.

The turbine rotor 204 is comprised of a circular upper rim 212, a circular lower rim 214 spaced apart from the upper rim 212 and a plurality of blades 216 spacedly extended between the upper and lower rims 212 and 214. In FIG. 2, the upper rim 212 of the turbine rotor 204 is supported below and aligned with the top frame 208 of the supporting frame 202. The lower rim 214 of the turbine rotor 204 is supported above and aligned with the rail frame 206. In the preferred embodiment, the turbine rotor 204 is driven to rotate along the rail frame 206 in responsive to wind force exerting at the blades 216. Therefore, the blades 216 are not driven to rotate but are able to drive the entire turbine rotor 204 to rotate. In the preferred embodiment, low frequency noises generated from the blade tip speed (HAWT) is minimized or eliminated with the turbine rotor 204. Since all the blades 216 are moving at the same speed relative to one another and no tip speed variation, the noise inherent with HAWT will not be prevalent.

The turbine rotor 204 is the only major moving component of the turbine wheel system 200. So, the traditional gearbox, yaw, motors, and pitch control system will be eliminated to reduce the maintenance of the turbine wheel system 200. Thus, no complicated casting or component used or required.

An electrical de-icing system can be utilized for blades 216 utilizing electricity generated heat. The electrical de-icing system forces heated air across the blades 216 as they are in motion.

Figure 9A:
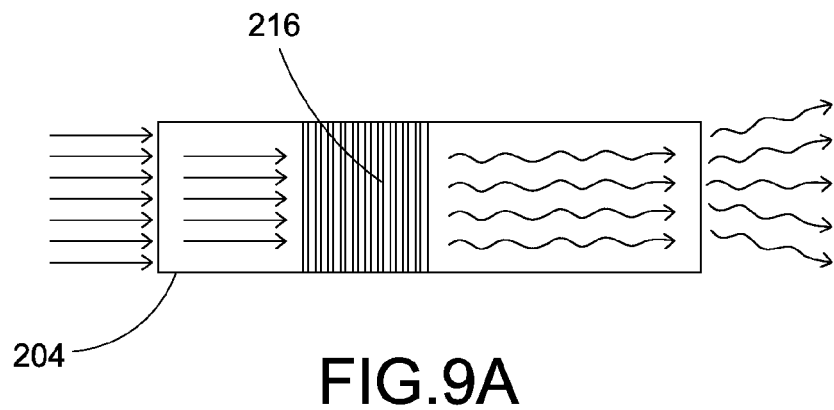
Figure 9B:
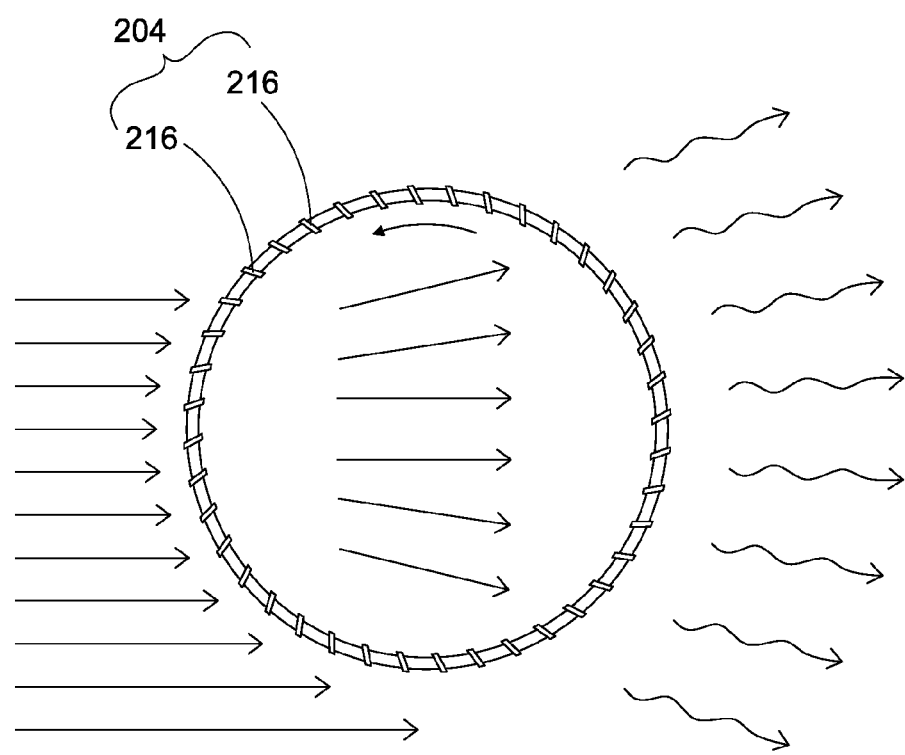

The turbine rotor 204 is enabled to be driven to rotate at different directions of airflow, wherein the airflow can be selectively guided to exhaust at different locations. For first Scenario, wind flows directly in one side of the turbine housing 100, flows across the center of the turbine rotor 204, and exhausts by diffusing out the opposite side of the turbine housing 100 in FIG. 9A and FIG. 9B.

Figure 10A:
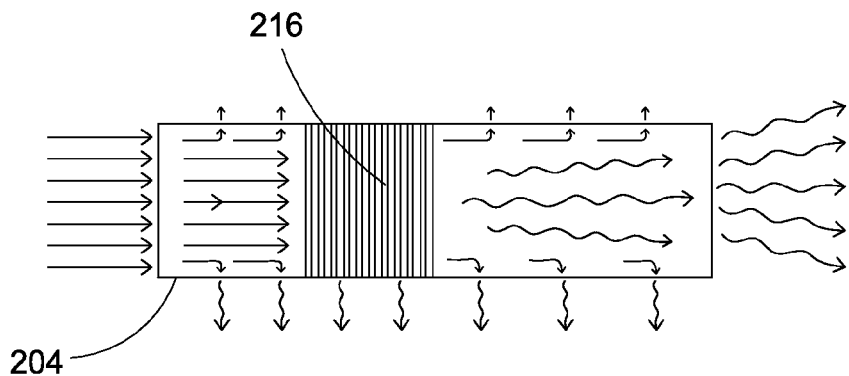
Figure 10B:
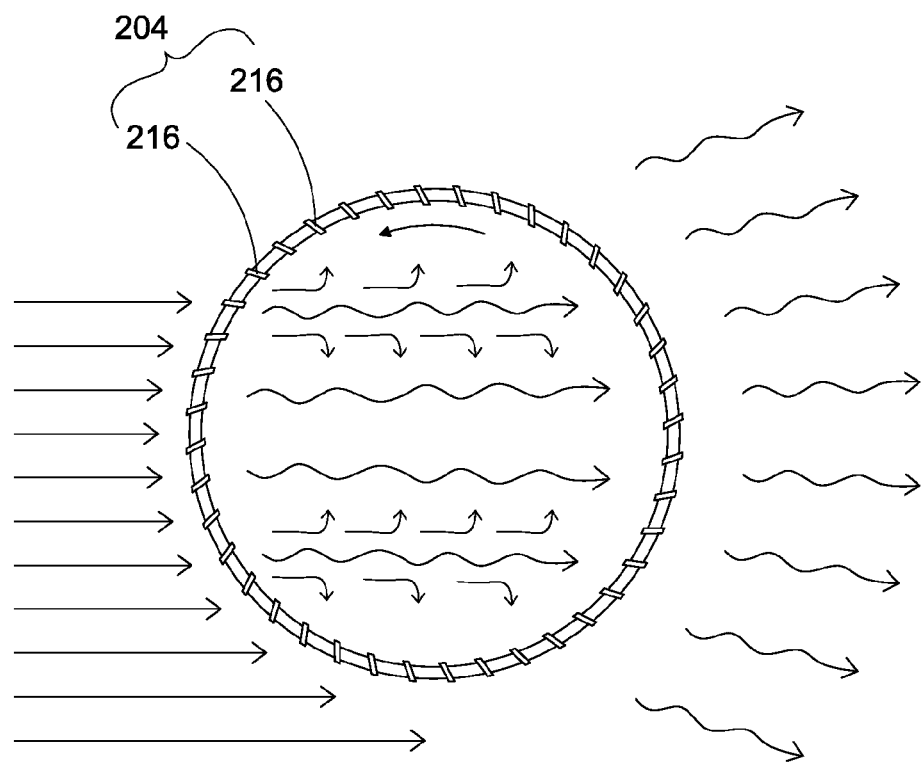

For second scenario, wind flows directly in one side of the turbine housing 100, across into the center of the turbine rotor 204, and exhausts by diffusing out of the opposite side of the turbine housing 100 and through the top roof 102 thereof via strategically placed ducting in FIG. 10A and FIG. 10B.

For third scenario, wind flows directly in one side of the turbine housing 100, across into or near the center of the turbine rotor 204, and exhausts through the floor via strategically placed ducting in FIG. 10A and FIG. 10B.

For fourth Scenario, wind flows directly in from the circumference of the turbine housing 100, flows into or near the center of the turbine rotor 204, and exhausts through the floor and/or the top roof 102 of the turbine housing 100 via strategically placed ducting.

Figure 11A:
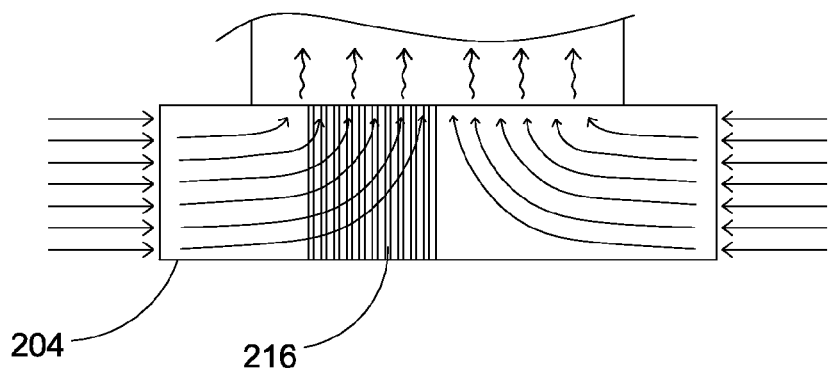
Figure 11B:
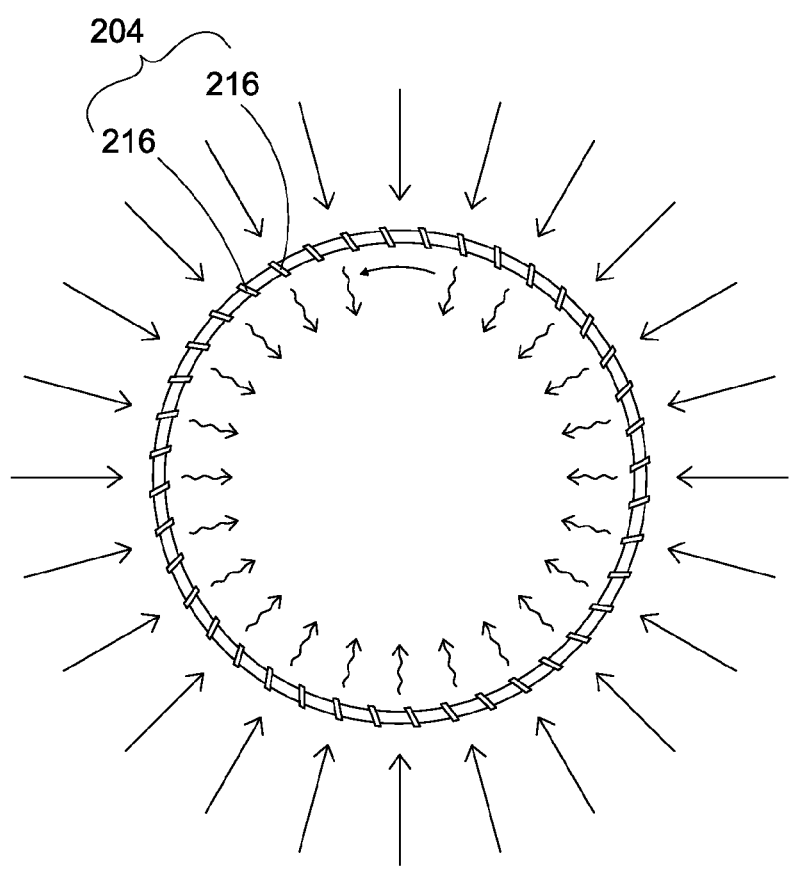

For fifth scenario, wind flows from 360 degrees across the turbine housing 100 from outside to inside, wherein the wind flows into the center of the turbine rotor 204 and is then exhausted through either the floor or the top roof of the turbine housing 100 via strategically placed ducting (one example of air supply would be a decommissioned mine shaft with moving column of air) in FIG. 11A and FIG. 11B.

Figure 12A:
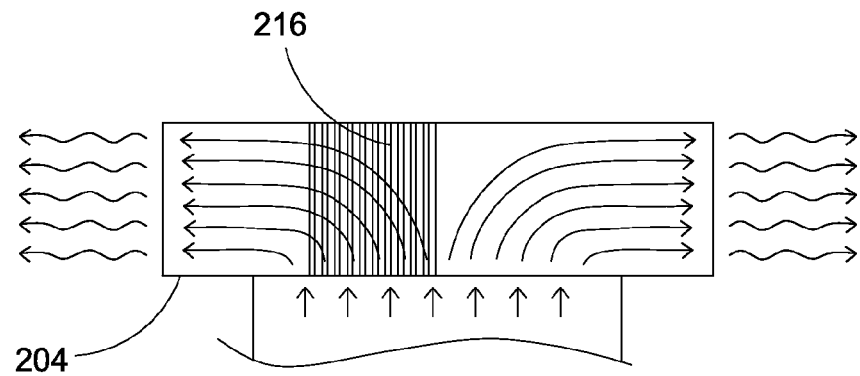
Figure 12B:
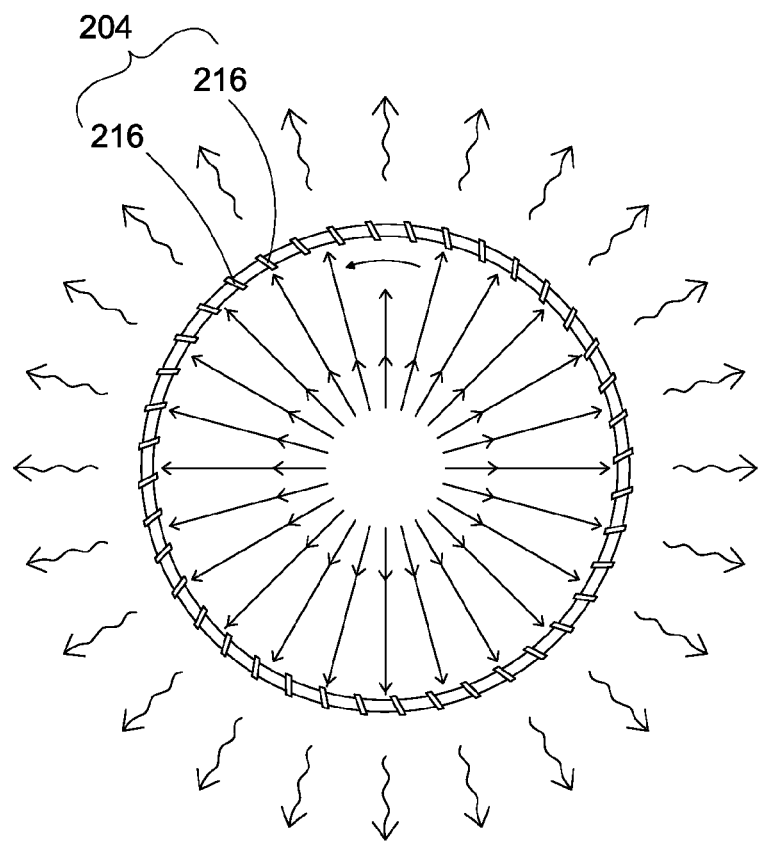

For sixth scenario, wind flows from 360 degrees across the turbine housing 100 from inside to outside. The wind flows from the center of the turbine rotor 204 is directed across the blades 216 from either the floor or the top roof 102 via strategically placed ducting (one example of this airflow from a high-rise building with moving column(s) of air in center) in FIG. 12A and FIG. 12B.

Figure 3:
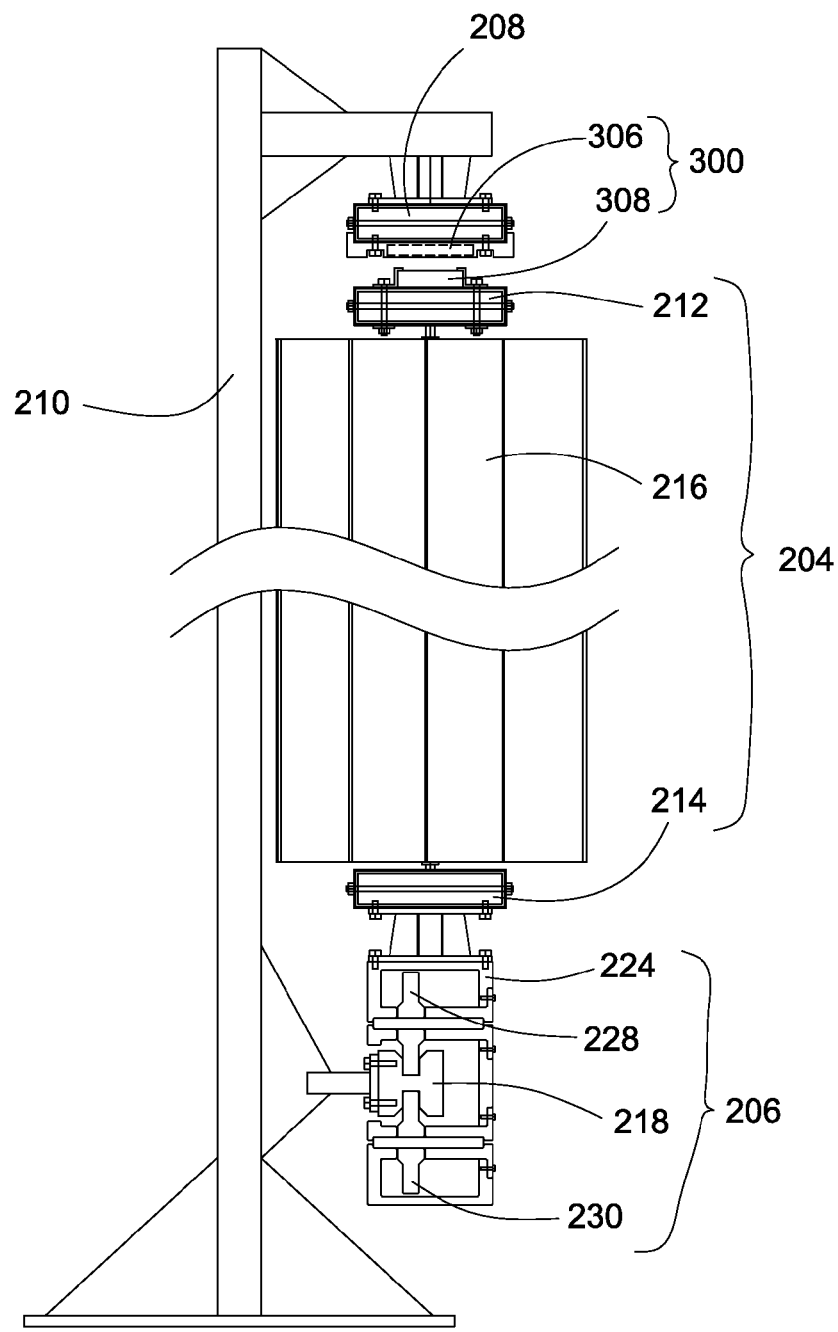
FIG. 3 is a sectional view of the turbine wheel system in accordance with the present invention
Figure 6:
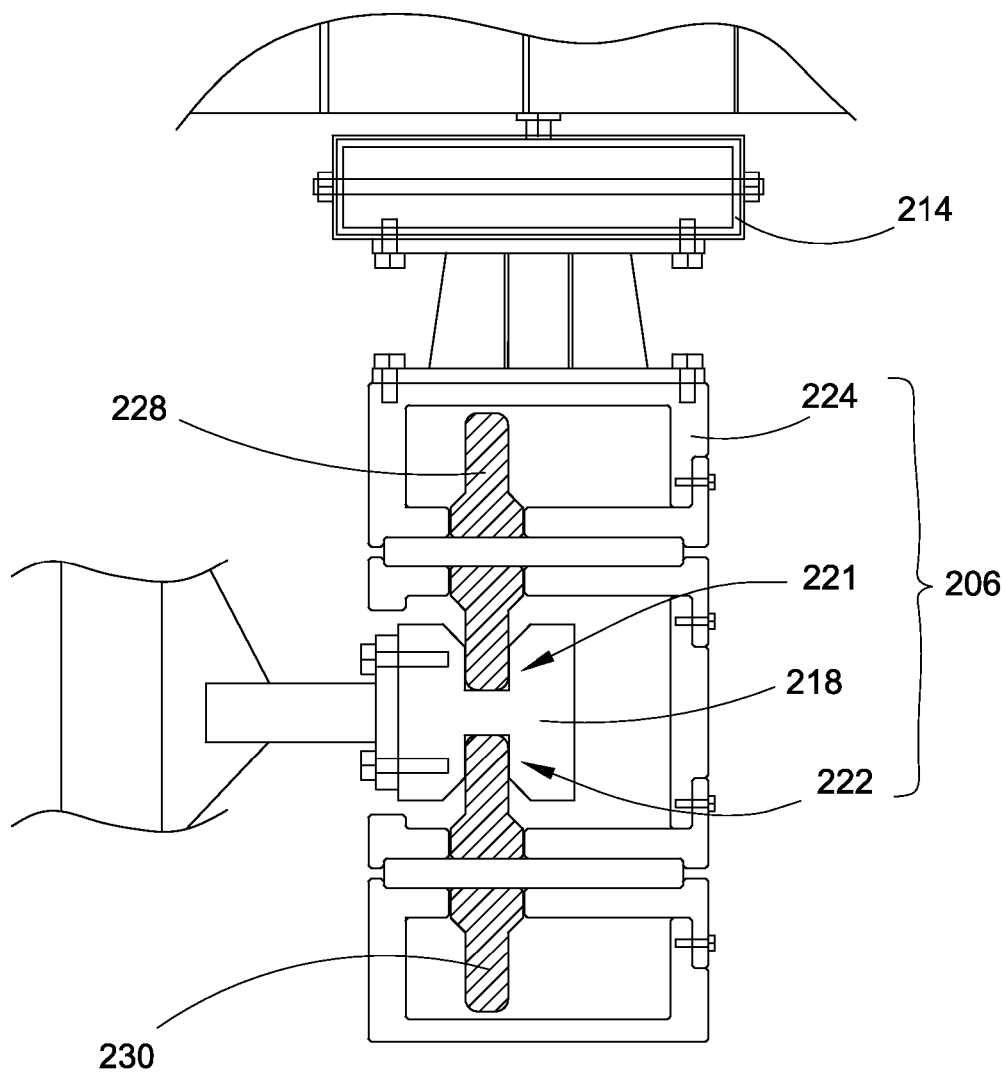
FIG. 6 shows the rail frame incorporating with the turbine wheel system in accordance with the present invention.

FIGS. 2, 3 and 6 depict the rail frame 206 which is comprised of a circular guiding rail 218 supported below the turbine rotor 204 and a bearing unit 220 coupled at the turbine rotor 204 to enable the turbine rotor 204 running along the guiding rail 218. The rail frame 206 is a mono-rail system with multiple bearing supports to guide and support the turbine rotor 204 via multiple stands, i.e. the supporting posts 210, around the circumference of the turbine rotor 204. Therefore, the rail frame 206 can remove the loads generated from the traditional center bearings to the circumference of the turbine rotor 204.

The guiding rail 218 supports the turbine rotor 204, wherein the guiding rail 218 is able to guide the turbine rotor 204 to rotate circumferentially. In FIG. 6, the guiding rail 218 is formed in a ring shape has a top rail surface, a bottom rail surface, a top wheel track 221 indented at the top rail surface, and a bottom wheel track 222 indented at the bottom rail surface. The top wheel track 221 is coaxial and aligned with the bottom wheel track 222.

The bearing unit 220 is comprised of a bearing housing 224 coupled at the lower rim 214 of the turbine rotor 204, and a wheel assembly 226 being received in the bearing housing 224 and operatively run at the guiding rail 218. In FIG. 6, the bearing housing 224 is downwardly extended from the lower rim 214 of the turbine rotor 204, so that when the turbine rotor 204 is rotated, the bearing housing 224 is correspondingly driven to rotate.

The wheel assembly 226 is comprised of a top wheel 228 rotatably supported in the bearing housing 224 to run along the top wheel track 221 of the guiding rail 218, and a bottom wheel 230 rotatably supported in the bearing housing 224 to run along the bottom wheel track 222 of the guiding rail 218. Therefore, the guiding rail 218 is engaged between the top and bottom wheel 228 and 230 to stabilize the rotational movement of the turbine rotor 204. The rail frame 206 will guide the orbit of the turbine rotor 204 to rotate for minimizing any lateral movement thereof. With the complete departure from the traditional center bearing supports, such as the vertical axis wind turbine (VAWT) design or the horizontal axis wind turbine (HAWT) design, the present invention moves the bearings from the center axis to the circumference or outside of the turbine wheel system 200.

Figure 4:
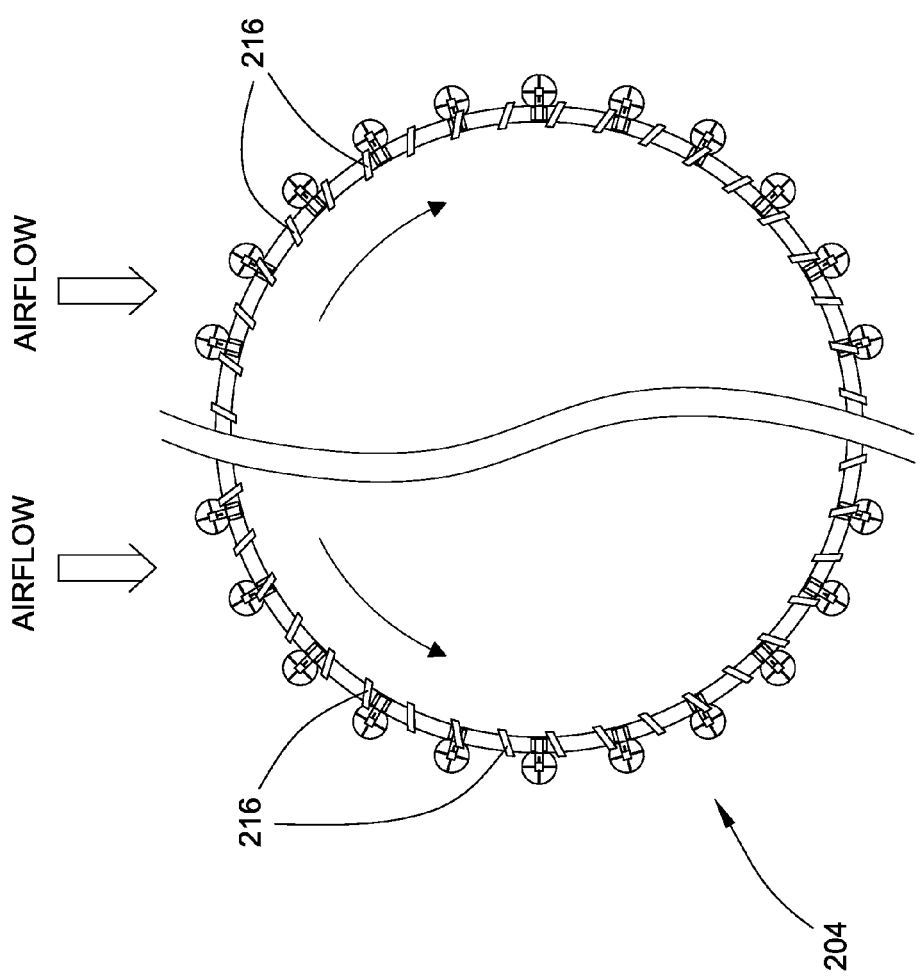
FIG. 4 shows the blade pitch of the blade of the turbine wheel system in accordance with the present invention.

In FIG. 4, the turbine rotor 204 can be rotated at either clockwise direction or counterclockwise direction, wherein the blade pitch of each of the blades 216 is selectively adjusted to control a rotational direction of the turbine rotor 204. The direction of rotation of the turbine rotor 204 is based on the blade angle of each of the blades 216. When the blade pitch of each of the blades 216 is selectively adjusted at one orientation, i.e. the leading edge of each blade 216 is to the left of center of the turbine rotor 204, the turbine rotor 204 will be driven to rotate at the clockwise direction. When the blade pitch of each of the blades 216 is selectively adjusted at an opposite orientation, i.e. the leading edge of each blade 216 is to the right of center of the turbine rotor 204, the turbine rotor 204 will be driven to rotate at the counterclockwise direction.

Figure 5:
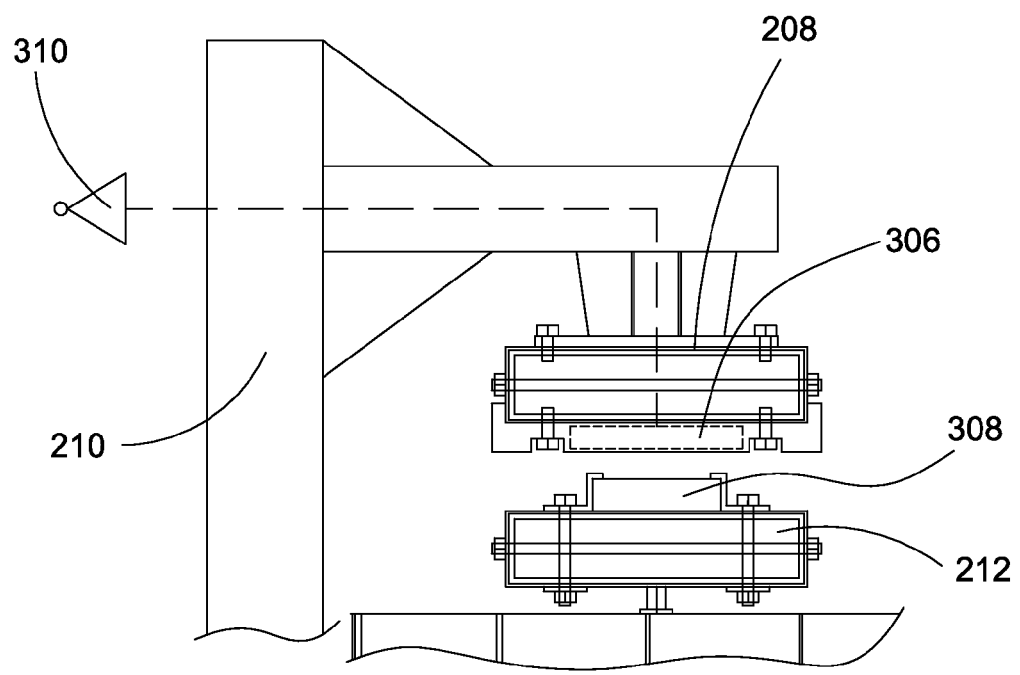
FIG. 5 shows the power converting system incorporating with the turbine wheel system in accordance with the present invention.

FIGS. 2 and 5 depict the power converting system 300 for converting kinetic energy of the turbine rotor 204 into useable energy such as electrical energy and/or mechanical energy. The power converting system 300, which is a coil-and-magnet system, is comprised of a coil module 302 supported by the supporting frame 202 and a magnet unit 304 supported on the upper rim 212 of the turbine rotor 204 and being spaced apart from the coil module 302. When the turbine rotor 204 is rotated along the rail frame 206, the magnet unit 304 is driven to move and is magnetically inducted with the coil module 302 for generating the electrical energy.

In FIG. 5, the top frame 208 of the supporting frame 202 is spaced apart from and is aligned with the upper rim 212 of the turbine rotor 204, wherein an induction clearance is defined between the top frame 208 and the upper rim 212. The power converting system 300 is provided at the induction clearance for electrical energy production. The coil module 302 is generally comprised of a plurality of coil units 306 spaced apart and positioned at the bottom side of the top frame 208 of the supporting frame 202.

The magnet unit 304 comprises a plurality of permanent magnets 308 spaced apart and positioned at the top side of the upper rim 212 of the turbine rotor 204, wherein the magnet unit 304 is spaced apart from the coil module 302 that the magnet unit 304 is not contact with the coil module 302. Therefore, when the turbine rotor 304 is rotated, the permanent magnets 308 will magnetically induce with the coil units 306 for generating the electrical energy. It is appreciated that the permanent magnets 308 of the magnet unit 304 are integrated to form a ring of permanent magnet coupled on the top side of the upper rim 212 to magnetically induce with the coil units 306. An electrical power collecting cable is extended from each of the coil units 306 and is guided to extend through the supporting frame 202 for transmitting the electrical energy from the coil module 302 to a designated storage area via invertors 310.

In the preferred embodiment, the modular design of the coil module 302 and the magnet unit 304 ensures the proper operation of the power converting system 300, wherein if one of the coil units 306 or permanent magnets 308 fails to operate, the power converting system 300 will continue to operate while the rest of the coil units 306, permanent magnets 308, and invertors 310 divert and add capacity output to compensate. The malfunctioned coil unit 306 or permanent magnet 308 can be easily monitored and replaced to reduce the maintenance cost of the power converting system 300. Thus, heat generated is able to dissipate around the circumference of the turbine wheel system 200. No requirement for added liquid cooling.

Figure 7:
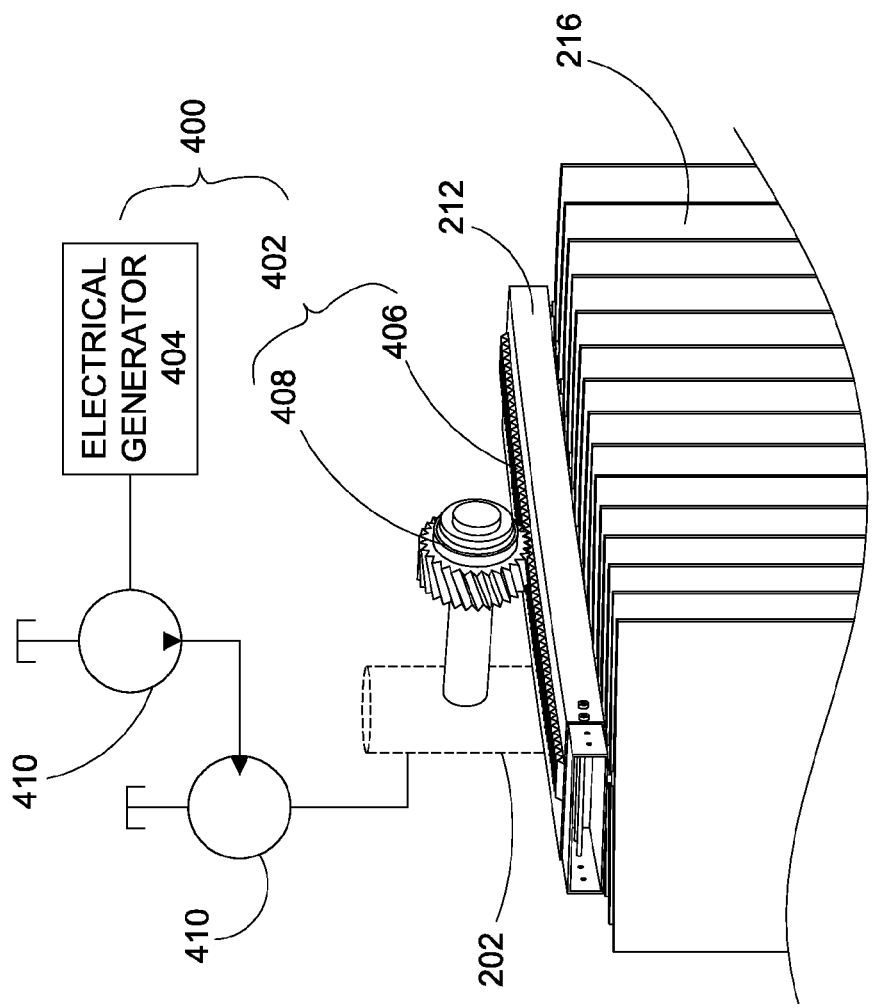
FIG. 7 shows an alternative of the power converting system incorporating with the turbine wheel system in accordance with the present invention.

FIG. 7 depicts an alternative of the power converting system 400 which is comprised of a rack-and-pinion system 402 and an energy convertor. The rack-and-pinion system 402 is comprised of a rack unit 406 operatively coupled at the turbine rotor 204 and a gear unit 408 meshed with the rack unit 496, wherein the gear unit 408 is driven to rotate when the turbine rotor 204 is rotated.

In FIG. 7, the rack unit 406 is a ring shaped rack at the top side of the upper rim 212 of the turbine rotor 204, wherein the rack unit 406 has a top meshing surface. The gear unit 408, such as a pinion element, is rotatably supported by the supporting frame 202 to mesh with the rack unit 406. Therefore, when the turbine rotor 204 is rotated, the rack unit 406 is correspondingly driven to move in order to drive the gear unit 408 to rotate.

In order to transmit the rotatably mechanical power from the rack-and-pinion system 402, the energy convertor is comprised of a hydraulic motor module 410 is operatively linked between the rack-and-pinion system 402 and an energy output. The hydraulic motor module 410 is comprised of a hydraulic motor is utilized that converts the mechanical power to fluid and moves it to another hydraulic motors and converts back to the rotatably mechanical power.

It is appreciated that the rack unit 406 can be located at the bottom side of the lower rim 214 of the turbine rotor 204 to mesh with the gear unit 408 being supported by the supporting frame 202. The rack unit 406 can also be located at the circumferential surface of the upper rim 212 or the dower rim 214 of the turbine rotor 204 to mesh with the gear unit 408. Therefore, it should not be limited the location of the rack-and-pinion system 402 because the entire turbine rotor 204 is rotated and the rack unit 406 can be formed at any portion of the turbine rotor 204 to drive the gear unit 408 to rotate for outputting the mechanical power.

The energy convertor can further comprises an electrical generator 404 for converting rotatably mechanical power from the rack-and-pinion system 402 to the electrical energy. The simplest way to obtain electrical energy from the rack-and-pinion system 402 is to operatively link the electrical generator 404 to the hydraulic motor module 410. Then, the rotatably mechanical power from the hydraulic motor module 410 is used as a driving power to power up the electrical generator 404.

Figure 8:
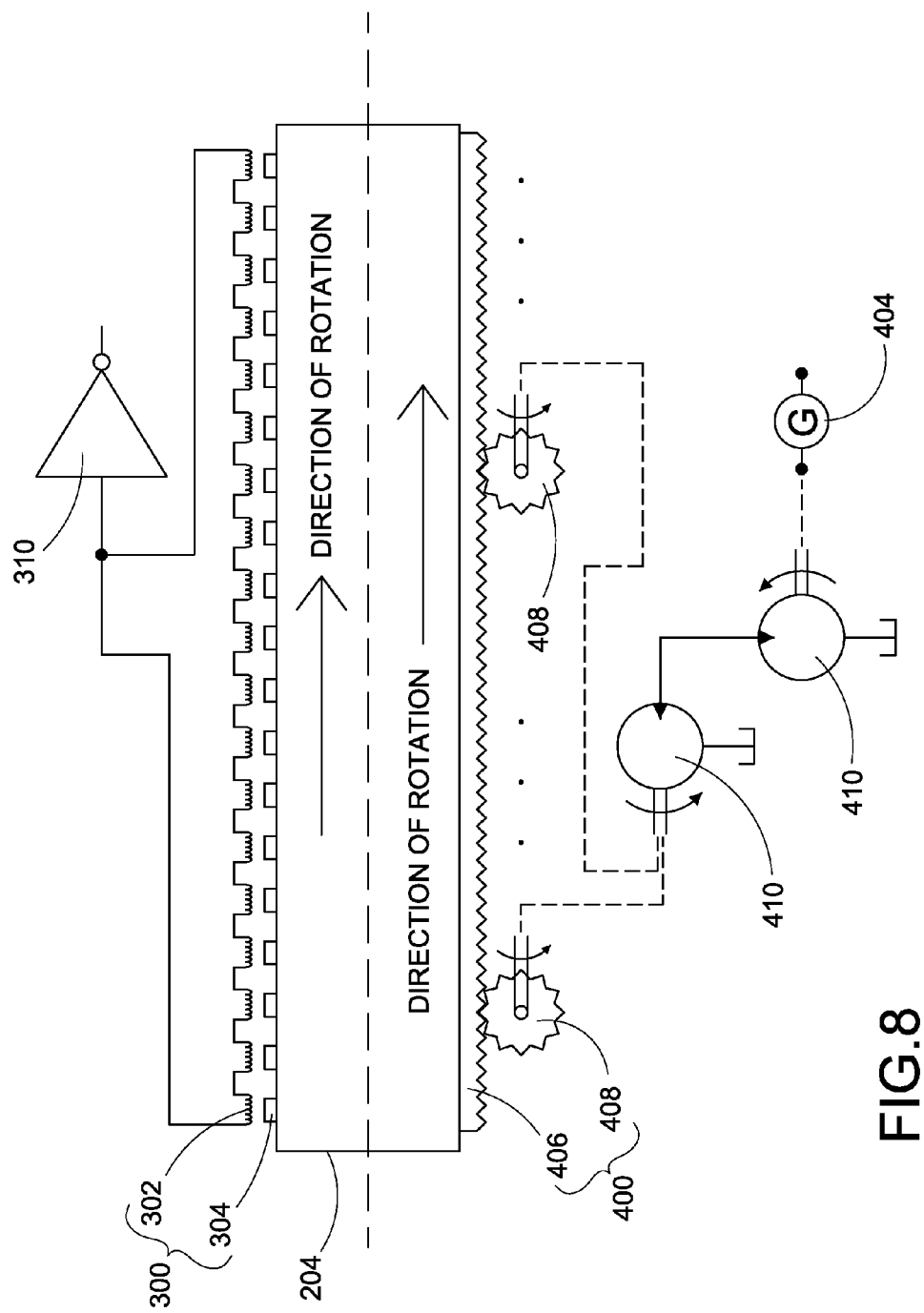
FIG. 8 shows multiple energy output of the turbine wheel system in accordance with the present invention, wherein the power converting system includes both the coil-and-magnet system and rack-and-pinion system.

In FIG. 8, multiple energy output can also be achieved by the power converting systems 300 and 400. The coil module 302 and magnet unit 304 are configured at the top portion of the turbine wheel system 200 whereas the rack-and-pinion system 402 is configured at the bottom portion of the turbine wheel system 200. Therefore, when the turbine rotor 204 is rotated, both the power converting systems 300 and 400 are operated for generating multiple energy output.

It is appreciated that the rack-and-pinion system 402 is embodied to incorporate with the rail frame 206 that the rack-and-pinion system 402 is also utilized for supporting and guiding the turbine rotor 204 as well as for transmitting the rotatably mechanical power from the turbine rotor 204 to the electrical generator 404.

Figure 13:
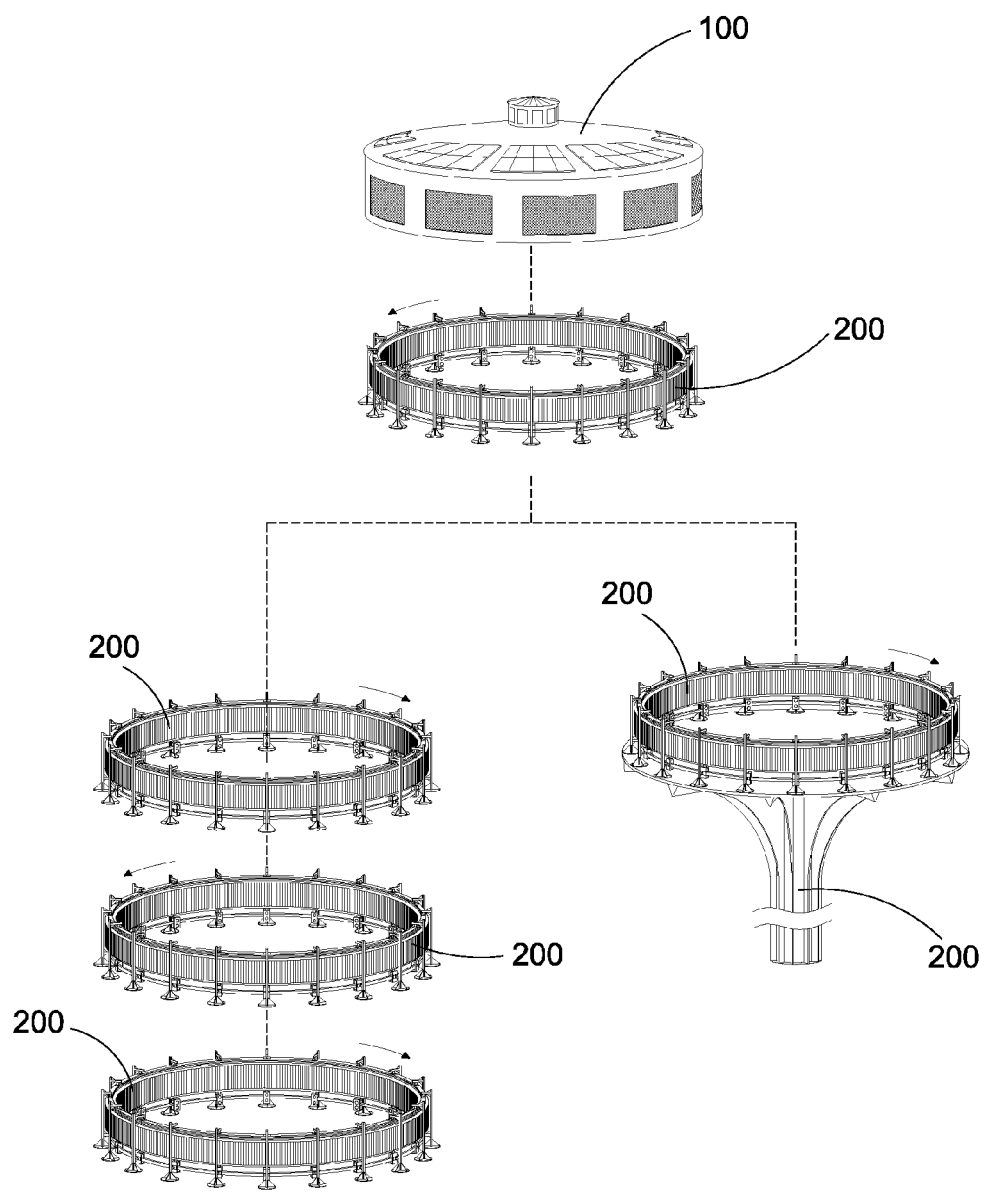
FIG. 13 shows the stackable configuration of the turbine wheel systems with alternative supporting frame in accordance with the present invention.

FIG. 13 depicts the stackable configuration of the turbine wheel systems 200, wherein the turbine wheel systems 200 stacked on top of each other that one of the turbine wheel systems 200 is stacked on top of another turbine wheel system 200. All the turbine wheel systems 200 are enclosed within the single turbine housing 100. Due to the scalability and stack-ability of the present invention, it can be chosen multi-system configurations that allow any numbers stacked up to 8 systems or more. It also provides versatility and adaptability to any project size and sites. Building may be located on or near ground level as well. Custom designs and sizes of the turbine wheel systems 200 are always available to the customer for accommodating a particular application or special require.

In the field, it will have floors between each two turbine wheel systems 200. The design allows for ducting to be centralized for increasing the chimney effect to aid further energy recovery and production. The stackable design also will allow for a greater output on an overall footprint given the reduction in required lease roads, construction material including concrete, rebar, and overall land required to be used to service a similar size.

When multiple turbine wheel systems 200 are stacked, the turbine rotors 204 of the turbine wheel systems 200 are driven to rotate. Therefore, the power converting systems 300 will convert the kinetic energy of the turbine rotors 204 into the electrical energy. It is preferred that the turbine wheel systems 200 are stacked in pairs, wherein the turbine rotors 204 are alternated to rotate at opposite directions. When one turbine rotor 204 is rotated clockwise, the corresponding turbine rotor 204 positioned on top or below that turbine rotor 204 will be rotated counterclockwise. The alternated rotational directions of the turbine rotors 204 will help neutralize any gyroscopic effect during operation.

In FIG. 13, a pedestal 232 is mounted to the bottom of the supporting frame 202 to elevate the turbine wheel systems 200 at a predetermined height from the ground. In the preferred embodiment, the wind turbine provides different installation configurations. For ground installation, one or more turbine wheel systems 200 can be setup via the supporting frame 202 by installing the supporting posts 210 on the ground. Each supporting post 210 is a height-adjustable post to be adjusted for keeping the balance of the turbine rotor 204. Therefore, the wind turbine can be installed on the roof of the building, especially the high rise building. The pedestal 232 would show the best results when multiple turbine wheel systems 200 are stacked on top of each other, especially the site having geographical limitation, wherein the multiple turbine wheel systems 200 will be elevated at a predetermined height by the pedestal 232 from the ground.

The present invention is designed to reduce the complexity of manufacturing, transportation, setup, and overall maintenance requirements. Many of the components are available straight off the shelf to streamline both the manufacturing process and reduced maintenance schedule. The present invention further provides ease of transportation to site locations by modulating all the components and using cargo containers to ship to a location anywhere in the world.

Figure 14:
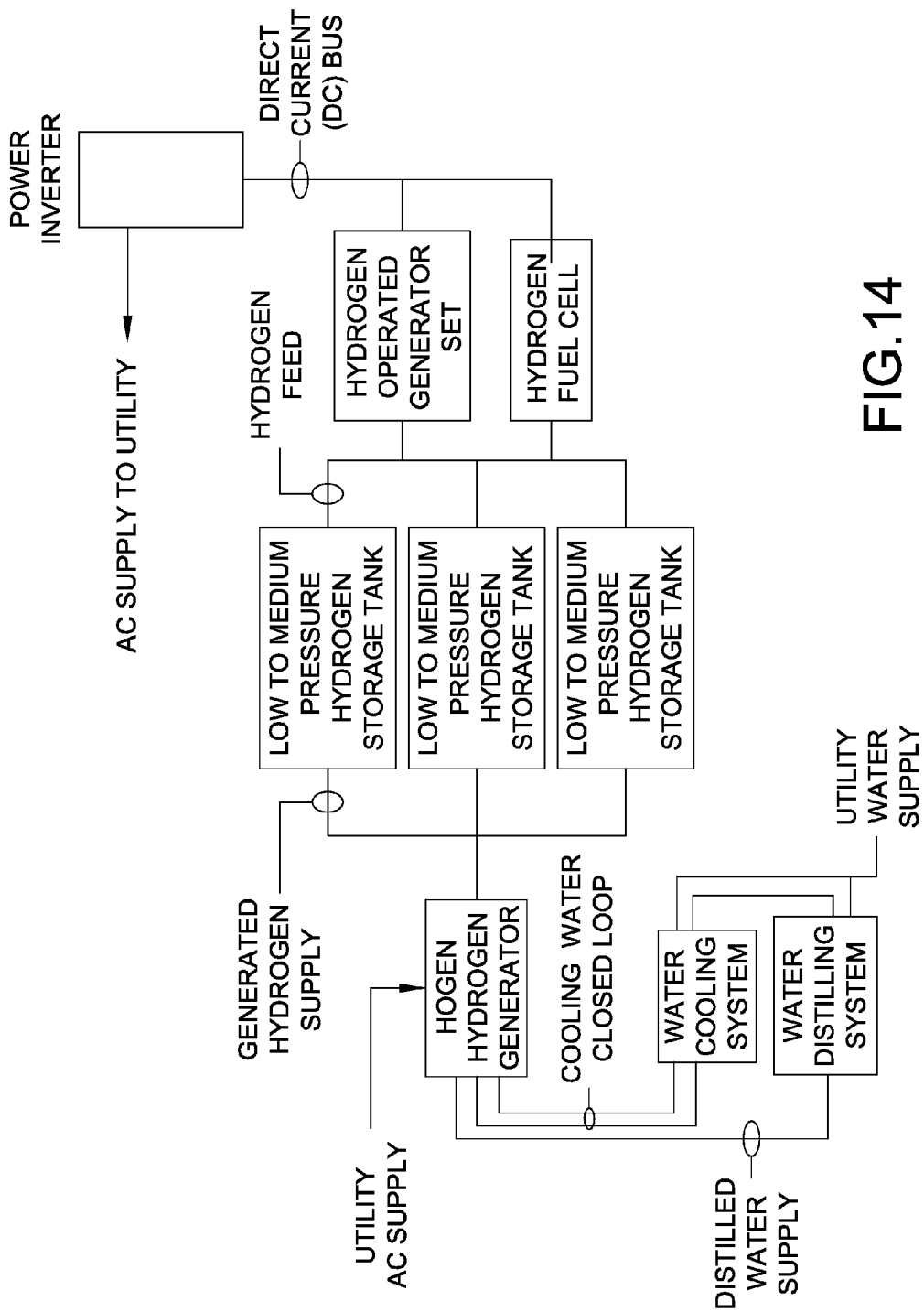
FIG. 14 shows the wind turbine incorporating with a hydrogen generation (HOGEN) storage plant in accordance with the present invention.

It is mentioned that the wind turbine can incorporate with other energy generation system for storage of energy and other means of energy generation. The turbine housing 100 is built in storage spaces that available for other uses or applications. One option is to have an onsite Hydrogen Generation (HOGEN) storage plant. The space required would be equivalent to that of a 40' cargo container footprint. Storage tanks for hydrogen may be placed as required for added storage capacity. FIG. 14 depicts the Hydrogen Generation (HOGEN) storage plant incorporating with the wind turbine of the present invention.

Application dependent with up to 92 MW equivalent hydrogen generated and stored energy onsite. This offers many new options that were previously not available to customers or utilities. Anytime conditions are such that the power generated is greater than the grid requires, the extra energy is used to convert water into hydrogen and then stored in special storage tanks. When the extra load is required or supplementary power needs to be added due to less than ideal wind conditions, the hydrogen gas is used and converted back into electricity. Cost for this added feature depends on how much storage is required and how much energy has to be converted over a given time frame. The entire process is completely carbon free.

Figure 15:
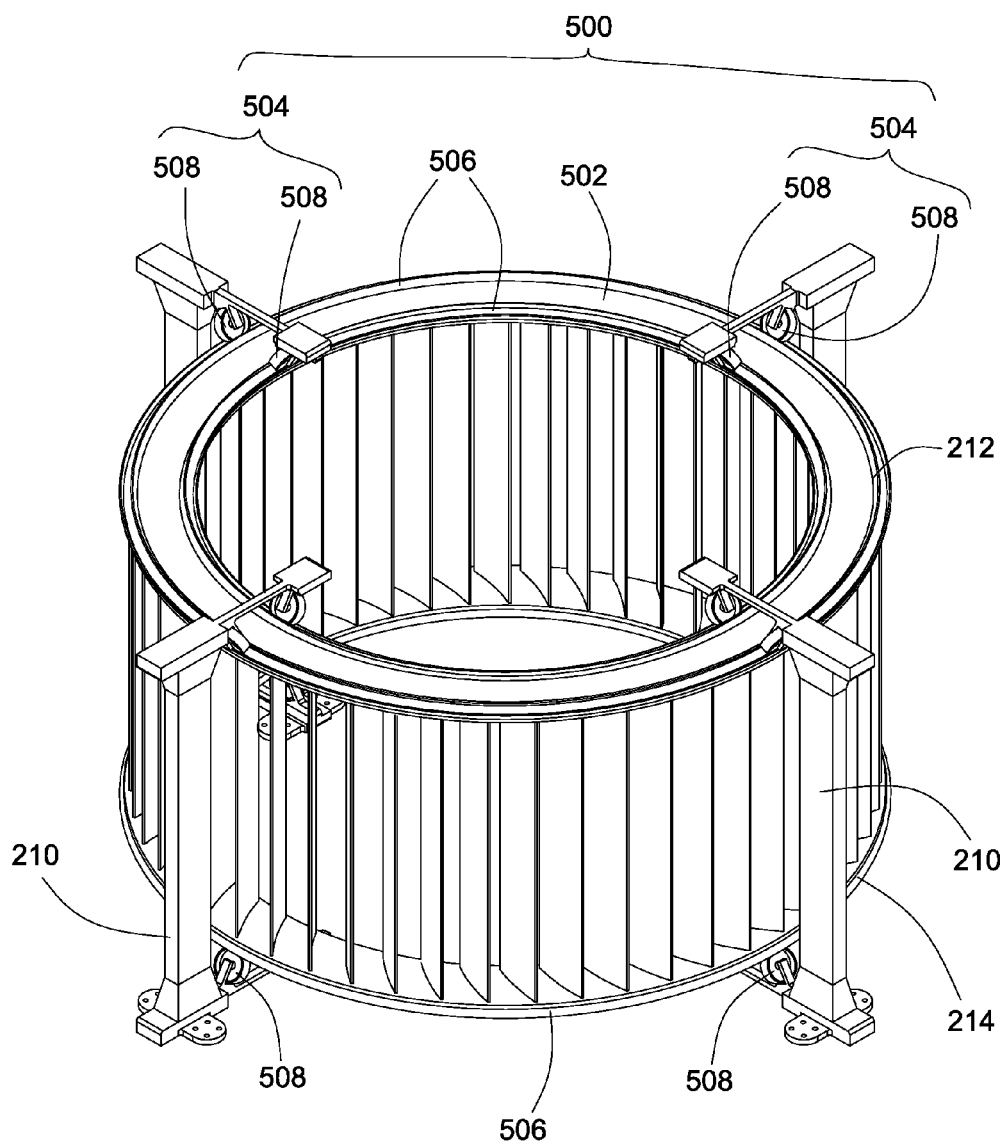
FIG. 15 shows a first alternative of the rail frame in accordance with the present invention.

FIG. 15 depicts an alternative of the rail frame 500 to guide the turbine rotor 204 to rotate circumferentially, wherein the rail frame 500 is comprised of a circular guiding rail 502 and a wheel assembly 504. In FIG. 15, the guiding rail 502 is formed in a ring shape and is integrated with at least one of the upper and lower rims 212 and 214 of the turbine rotor 204. The wheel assembly 504 is comprised of a plurality of wheels 508, wherein the wheels 508 are formed in pairs as an outer wheel and an inner wheel.

For first scenery that the guiding rail 502 is formed at and integrated with the upper rim 212, the guiding rail 502 has two indented wheel tracks 506 formed at two peripheral sides of the top surface of the guiding rail 502. The two wheels 508 are supported inclinedly and coupled with two peripheral sides of the guiding rail 502, wherein the two wheels 508 are engaged with the wheel tracks 506 respectively to enable the turbine rotor running along said guiding rail 502. The two wheels 508 are formed in "\/" configuration, wherein the outer wheel 508 (the wheel at the outer position) is downwardly and inwardly supported to engage with the outer wheel track 506 and the inner wheel 508 (the wheel at the inner position) is downwardly and outwardly supported to engage with the inner wheel track 506.

For second scenery that the guiding rail 502 is formed at and integrated with the lower rim 214, the guiding rail 502 has two indented wheel tracks 506 formed at two peripheral sides of the bottom surface of the guiding rail 502. The two wheels 508 are supported inclinedly and coupled with two peripheral sides of the guiding rail 502, wherein the two wheels 508 are engaged with the wheel tracks 506 respectively to enable the turbine rotor running along said guiding rail 502. The two wheels 508 are formed in "/ \" configuration, wherein the outer wheel 508 (the wheel at the outer position) is downwardly and outwardly supported to engage with the outer wheel track 506 and the inner wheel 508 (the wheel at the inner position) is downwardly and inwardly supported to engage with the inner wheel track 506.

Figure 16:
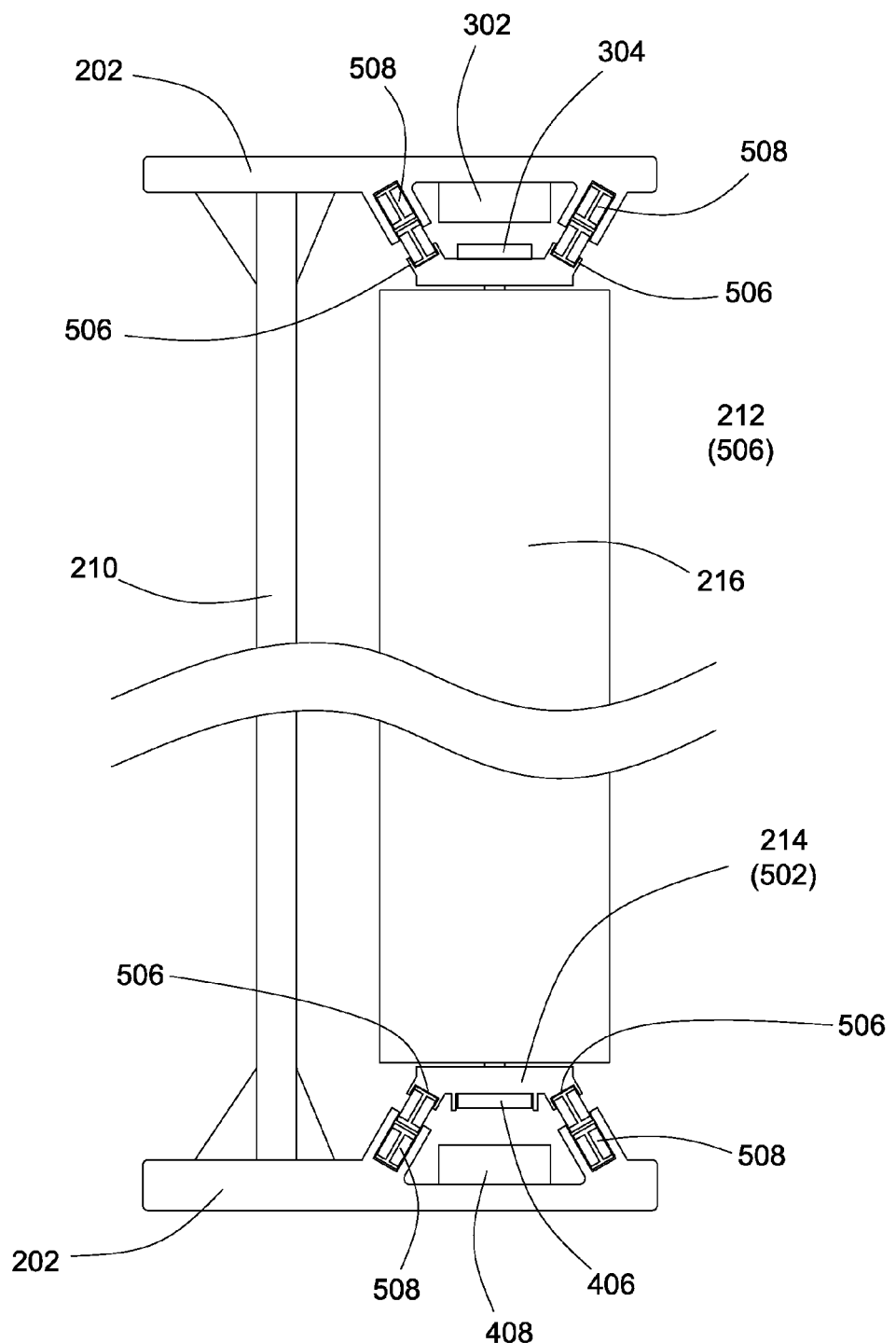
FIG. 16 shows the sectional view of the first alternative rail frame in accordance with the present invention.

For third scenery as a best mode that two guiding rails 502 are formed at and integrated with the upper and lower rims 212 and 214 in FIGS. 15 and 16. The configuration is the same as disclosed above.

In accordance with the present invention, the power converting system can be provided at the top side and/or the bottom side of the turbine rotor 204 to incorporate with the alternative rail frame 500. For example, the coil module 302 is supported by the supporting frame 202 and the magnet unit 304 is supported on the upper rim 212 of the turbine rotor 204. Likewise, the rack unit 406 is supported on the lower rim 214 of the turbine rotor 204 and the gear unit 408 is supported at the supporting frame 202. It should be appreciated that the power converting system can be provided any designated position of the turbine rotor 204.

Figure 17:
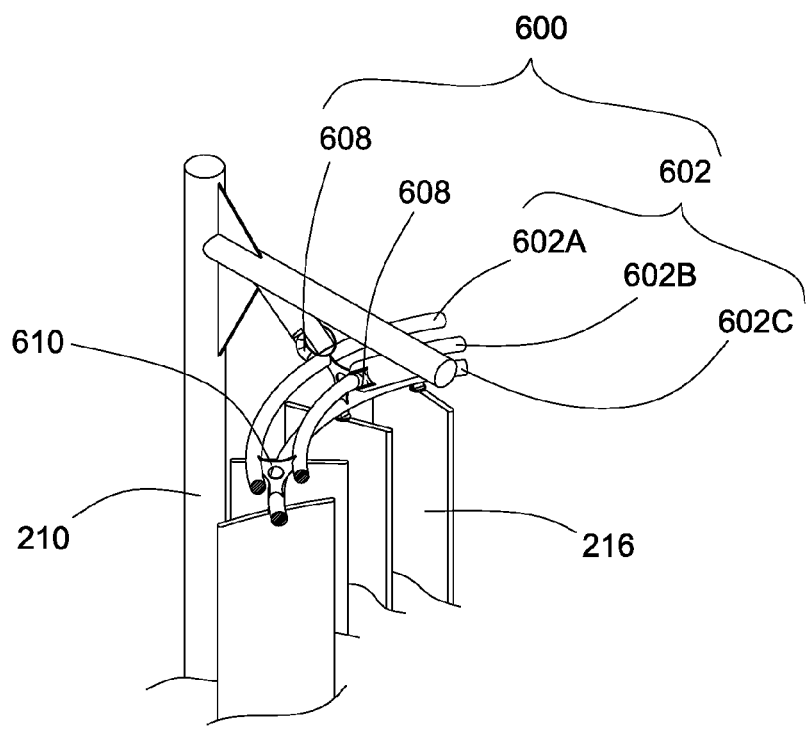
FIG. 17 shows a second alternative of the rail frame in accordance with the present invention, wherein the guiding rail is formed at and integrated with the upper rim.
Figure 18:
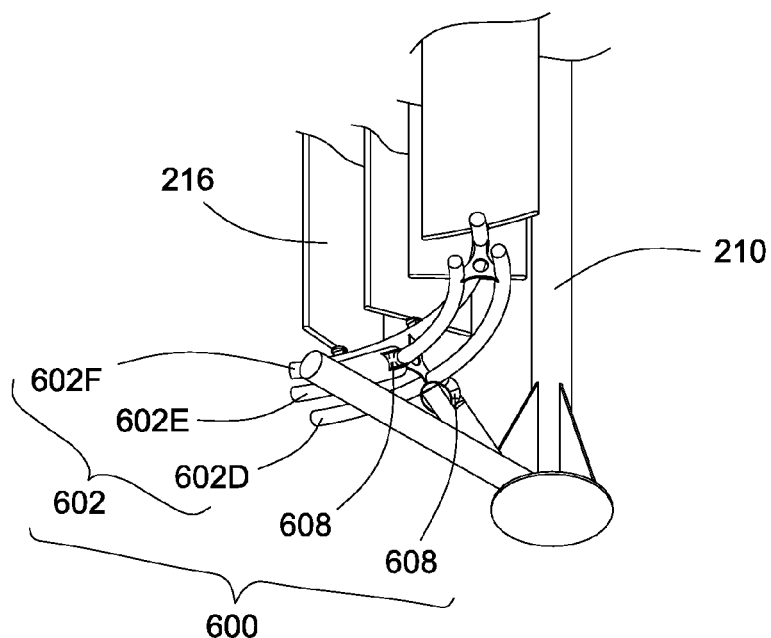
FIG. 18 shows the second alternative of the rail frame in accordance with the present invention, wherein the guiding rail is formed at and integrated with the lower rim.

FIGS. 17 and 18 depicts another alternative of the rail frame 600 to guide the turbine rotor 204 to rotate circumferentially, wherein the rail frame 600 is comprised of a ring shaped rail members 602, a spacing coupler 610 and a wheel assembly 604. In FIGS. 17 and 18, the guiding rail 602 is formed in a ring shape and is integrated with at least one of the upper and lower rims 212 and 214 of the turbine rotor 204. The wheel assembly 604 is comprised of a plurality of wheels 608, wherein the wheels 608 are formed in pairs as an outer wheel and an inner wheel.

There are preferably three rail members 602, wherein two of the rail members 602 are positioned at same horizontal level in coaxial manner to engage with the wheels 608 respectively. One of the rail members 602 is positioned at different horizontal level of these two corresponding rail members 602 in coaxial manner to couple with the blades 216, wherein the spacing coupler 610 is used for securing the three rail members 602 at different horizontal levels.

In FIG. 17, for first scenery that the guiding rail 602 is formed at and integrated with the upper rim 212, the two rail members 602 at same horizontal level are embodied as an upper and outer rail member 602A and an upper and inner rail member 602B, wherein the upper and inner rail member 602B is coaxial with and positioned in the upper and outer rail member 602A. The outer wheel 608 runs at the upper and outer rail member 602A and the inner wheel 608 runs at the upper and inner rail member 602B. The rail member 602 at different horizontal level is embodied as a lower rail member 602C positioned below the upper and inner rail member 602B and the upper and outer rail member 602A and located between the upper and inner rail member 602B and the upper and outer rail member 602A. The blades 216 are downwardly extended from the lower rail member 602C. The spacing coupler 610 forms in triangular shape and has three coupling arms coupled with the upper and outer rail member 602A, the upper and inner rail member 602B, and the lower rail member 602C. The spacing coupler 601 keeps the distance among the upper and outer rail member 602A, the upper and inner rail member 602B, and the lower rail member 602C.

In FIG. 18, for second scenery that the guiding rail 602 is formed at and integrated with the lower rim 214, the two rail members 602 at same horizontal level are embodied as a lower and outer rail member 602D and a lower and inner rail member 602E, wherein the lower and inner rail member 602E is coaxial with and positioned in the lower and outer rail member 602D. The outer wheel 608 runs at the lower and outer rail member 602D and the inner wheel 608 runs at the lower and inner rail member 602E. The rail member 602 at different horizontal level is embodied as an upper rail member 602F positioned above the lower and inner rail member 602E and the lower and outer rail member 602E and located between the lower and inner rail member 602E and the lower and outer rail member 602D. The blades 216 are upwardly extended from the upper rail member 602F. The spacing coupler 610 forms in triangular shape and has three coupling arms coupled with the lower and outer rail member 602D, the lower and inner rail member 602E, and the upper rail member 602F. The spacing coupler 601 keeps the distance among the lower and outer rail member 602D, the lower and inner rail member 602E, and the upper rail member 602F.

For third scenery as a best mode that two guiding rails 602 are formed at and integrated with the upper and lower rims 212 and 214. Therefore, the blades 216 are extended between the lower rail member 602C and the upper rail member 602F.

Figure 19:
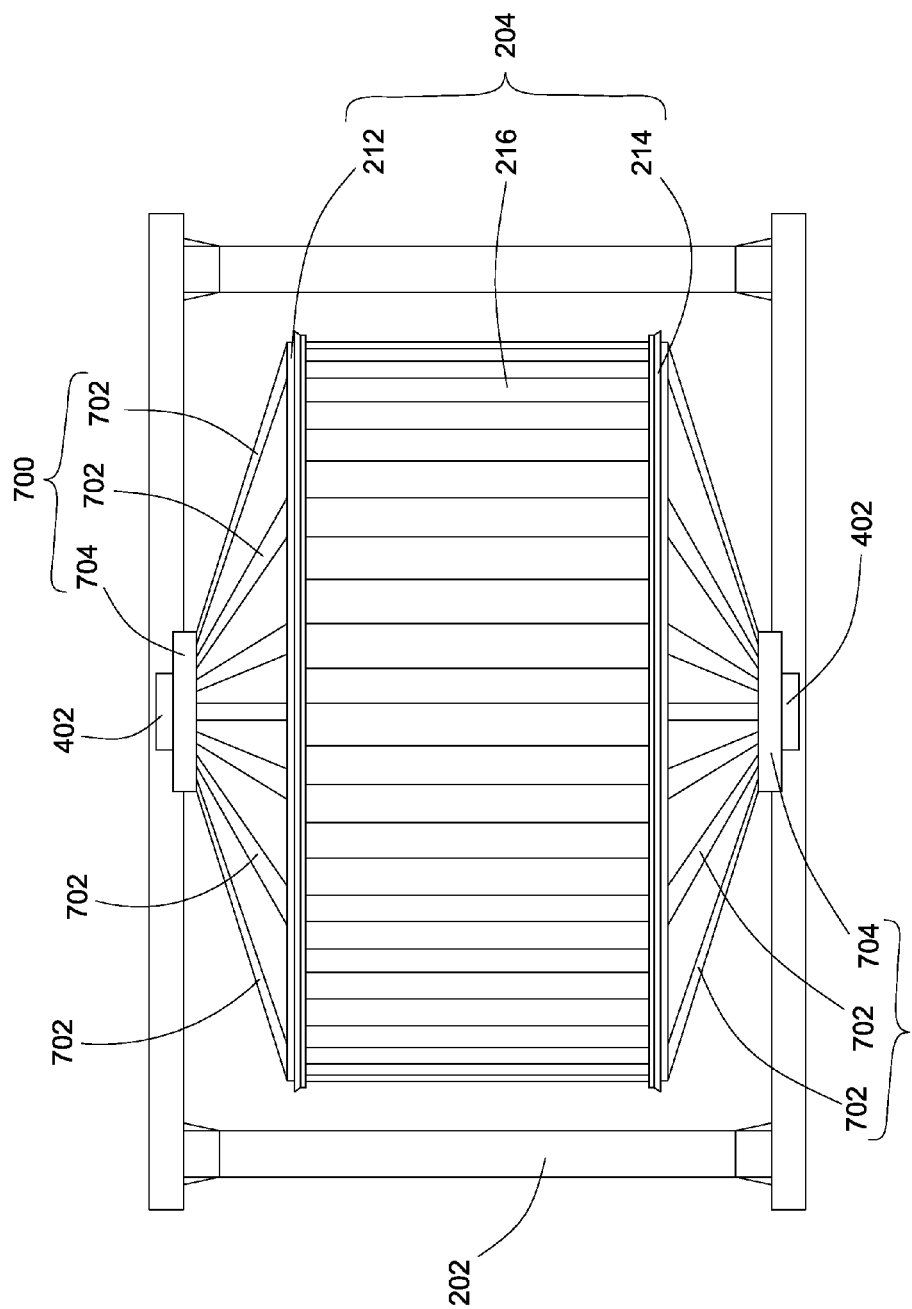
FIG. 19 shows a third alternative of the rail frame in accordance with the present invention.

FIG. 19 depicts another alternative of the rail frame 700 to guide the turbine rotor 204 to rotate circumferentially, wherein the rail frame 700 is comprised of a plurality of spokes 702 radially and inwardly extended from the turbine rotor 204 toward a center thereof and a bearing hub 704 coupled with the spokes 702 to enable the turbine rotor 204 being rotated circumferentially.

The spokes 702 can be radially, inwardly, and upwardly extended from the upper side of the turbine rotor 204, preferably from the upper rim 212 thereof, wherein the bearing hub 702 is supported by the supporting frame 202 is operatively coupled with the upper ends of the spokes 702.

The spokes 702 can be radially, inwardly, and downwardly extended from the lower side of the turbine rotor 204, preferably from the lower rim 214 thereof, wherein the bearing hub 702 is supported by the supporting frame 202 is operatively coupled with the lower ends of the spokes 702.

It is preferred the spokes 702 are extended from both the upper and lower sides of the turbines rotor 204, wherein two bearing hubs 704 are used to enable the turbine rotor 204 being rotated circumferentially.

In this case, the bearing hubs 704 can transfer the kinetic energy in form of mechanical energy from the turbine rotor 204 to the power converting system. It is preferred the spokes 702 are formed with a blade configuration to enhance the driving rotational power to the turbine rotor 204 in responsive to wind force exerting at the spokes 702. That is to say, the rack-and-pinion system 402 can be operatively coupled to the bearing hub 704 to transfer the kinetic energy in form of mechanical energy from the turbine rotor 204.

Figure 20:
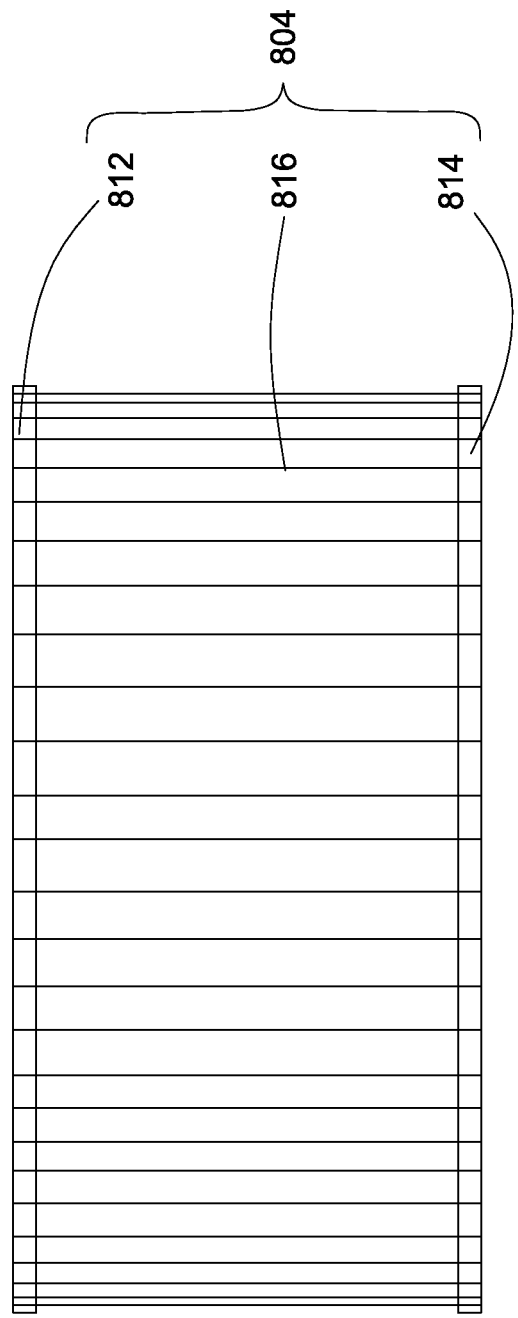
FIG. 20 shows an alternative of the turbine rotor frame in accordance with the present invention.

FIG. 20 depicts another alternative of the turbine rotor 804, wherein the turbine rotor 804 is comprised of a circular upper rim 812, a circular lower rim 814 spaced apart from the upper rim 812 and a plurality of blades 816 spacedly extended between the upper and lower rims 812 and 814. In this alternative, the upper rim 812 forms an upper blade cap, wherein an upper end portion of each of the blades 816 (the upper blade tip) is held within the upper blade cap of the upper rim 812. The lower rim 814 forms a lower blade cap, wherein a lower end portion of each of the blades 816 (the lower blade tip) is held within the lower blade cap of the lower rim 812. Therefore, the upper and lower blade caps can secure the blades 816 in position to stop air spilling over the edge and tie all the blade tips together for added strength.

While the embodiments and alternatives of the present invention have been shown and described, it will be apparent to one skilled in the art that various other changes and modifications can be made without departing from the spirit and scope of the present invention. For example, the power converting system can be incorporated with the turbine rotor and its alternatives, and the different configurations of the rail frame. They are all interchangeable.

What is claimed is:

1. A wind turbine, comprising:
a turbine wheel system; and
a wind power converting system;
said turbine wheel system comprising a supporting frame, a turbine rotor supported by said supporting frame, and a rail frame coupled to said supporting frame to guide a circumferentially rotational movement of said turbine rotor, wherein said turbine rotor comprises a plurality of blades spacedly supported at a circumference of said turbine rotor, wherein said turbine rotor is driven to rotate along said rail frame in response to wind force exerting at said blades for generating kinetic energy;
said wind power converting system comprising a generator for converting said kinetic energy of said turbine rotor into electrical energy or a motor module for converting said kinetic energy into mechanical energy.

2. The wind turbine of claim 1 wherein said turbine rotor comprises a circular upper rim and a circular lower rim spaced apart from said upper rim, wherein said blades are spacedly extended between said upper and lower rims.

3. The wind turbine of claim 2 wherein said rail frame comprises a circular guiding rail supported below said turbine rotor and a bearing unit coupled at said turbine rotor to enable said turbine rotor running along said guiding rail.

4. The wind turbine of claim 3, wherein said bearing unit comprises a bearing housing coupled at said lower rim of said turbine wheel system, and a wheel assembly being received in said bearing housing and operatively run at said guiding rail.

5. The wind turbine of claim 4 wherein said wind power converting system comprises a coil module and a magnet unit, said coil module being supported by said supporting frame, said magnet unit being supported by said turbine rotor and being spaced apart from said coil module, wherein when said turbine rotor is rotated along said rail frame, said coil module is magnetically inducted with said magnet unit for generating said electrical energy.

6. The wind turbine of claim 5 wherein said supporting frame comprises a circular top frame and a plurality of supporting posts downwardly extended from said top frame to support said top frame above said turbine rotor and to support said rail frame below said turbine rotor.

7. The wind turbine of claim 6, wherein said coil module is mounted underneath said top frame and said magnet unit is supported on said upper rim of said turbine rotor to magnetically induct with said coil module when said turbine rotor is driven to rotate.

8. The wind turbine of claim 5 wherein a blade pitch of each of said blades is selectively adjusted to control a rotational direction of said turbine rotor.

9. The wind turbine of claim 5 further comprising a turbine housing which comprises a top roof and a circumferential wall defining a plurality of airflow screens, wherein said turbine wheel system is received in said turbine housing for enabling airflow passing through said airflow screens to said blades in order to drive said turbine rotor to rotate and for reducing noise generated by said turbine rotor.

10. The wind turbine of claim 4 wherein said wind power converting system comprises a rack-and-pinion system and an energy generator, said rack-and pinion system comprising a rack unit operatively coupled at said turbine rotor and a gear unit meshed with said rack unit, wherein said gear unit is driven to rotate when said turbine rotor is rotated, said energy generator operatively powered by said gear unit for converting said kinetic energy.

11. The wind turbine of claim 10, wherein said energy generator is an electrical generator operatively powered by said gear unit for generating said electrical energy.

12. The wind turbine of claim 10, wherein said energy generator is a hydraulic motor module operatively powered by said gear unit for generating said mechanical energy.

13. The wind turbine of claim 10 wherein said supporting frame comprises a circular top frame and a plurality of supporting posts downwardly extended from said top frame to support said top frame above said turbine rotor and to support said rail frame below said turbine rotor.

14. The wind turbine of claim 10 wherein a blade pitch of each of said blades is selectively adjusted to control a rotational direction of said turbine rotor.

15. The wind turbine of claim 10 further comprising a turbine housing which comprises a top roof and a circumferential wall defining a plurality of airflow screens, wherein said turbine wheel system is received in said turbine housing for enabling airflow passing through said airflow screens to said blades in order to drive said turbine rotor to rotate and for reducing noise generated by said turbine rotor.

16. The wind turbine of claim 1 wherein said wind power converting system comprises a coil module and a magnet unit, said coil module being supported by said supporting frame, said magnet unit being supported by said turbine rotor and being spaced apart from said coil module, wherein when said turbine rotor is rotated along said rail frame, said coil module is magnetically inducted with said magnet unit for generating said electrical energy.

17. The wind turbine of claim 16 wherein said supporting frame comprises a circular top frame and a plurality of supporting posts downwardly extended from said top frame to support said top frame above said turbine rotor and to support said rail frame below said turbine rotor.

18. The wind turbine of claim 17, wherein said coil module is mounted underneath said top frame and said magnet unit is supported on said upper rim of said turbine rotor to magnetically induct with said coil module when said turbine rotor is driven to rotate.

19. The wind turbine of claim 16 wherein said turbine rotor comprises a circular upper rim and a circular lower rim spaced apart from said upper rim, wherein said blades are spacedly extended between said upper and lower rims, wherein said rail frame comprises a circular guiding rail and a wheel assembly, said guiding rail integrated with one of said upper and lower rims of said turbine rotor, said wheel assembly comprising two wheels supported inclinedly and coupled with two peripheral sides of said guiding rail to enable said turbine rotor running along said guiding rail.

20. The wind turbine of claim 19 wherein said magnet unit is supported by said guiding rail, wherein said guiding rail has two indented wheel tracks formed at said peripheral sides of said guiding rail to engage with said wheels respectively.

21. The wind turbine of claim 19 wherein said guiding rail comprises a plurality of ring shaped rail members and a spacing coupler, two of said rail members positioned at same horizontal level in coaxial manner to engage with said wheels respectively, one of said rail members positioned at different horizontal level of said two corresponding rail members in coaxial manner to couple with said blades, said spacing coupler securing said rail members at different horizontal levels.

22. The wind turbine of claim 1 wherein said wind power converting system comprises a rack-and-pinion system and an energy generator, said rack-and-pinion system comprising a rack unit operatively coupled at said turbine rotor and a gear unit meshed with said rack unit, wherein said gear unit is driven to rotate when said turbine rotor is rotated, said energy generator operatively powered by said gear unit for converting said kinetic energy.

23. The wind turbine of claim 22, wherein said energy generator is an electrical generator operatively powered by said gear unit for generating said electrical energy.

24. The wind turbine of claim 22, wherein said energy generator is a hydraulic motor module operatively powered by said gear unit for generating said mechanical energy.

25. The wind turbine of claim 22 wherein said supporting frame comprises a circular top frame and a plurality of supporting posts downwardly extended from said top frame to support said top frame above said turbine rotor and to support said rail frame below said turbine rotor.

26. The wind turbine of claim 1 wherein a blade pitch of each of said blades is selectively adjusted to control a rotational direction of said turbine rotor.

27. The wind turbine of claim 1 further comprising a turbine housing which comprises a top roof and a circumferential wall defining a plurality of airflow screens, wherein said turbine wheel system is received in said turbine housing for enabling airflow passing through said airflow screens to said blades in order to drive said turbine rotor to rotate and for reducing noise generated by said turbine rotor.

28. The wind turbine of claim 1 wherein said turbine rotor comprises a circular upper rim and a circular lower rim spaced apart from said upper rim, wherein said blades are spacedly extended between said upper and lower rims, wherein said rail frame comprises a circular guiding rail and a wheel assembly, said guiding rail integrated with one of said upper and lower rims of said turbine rotor, said wheel assembly comprising two wheels supported inclinedly and coupled with two peripheral sides of said guiding rail to enable said turbine rotor running along said guiding rail.

* * * * *